United States Patent [19]

Martin

[11] Patent Number: 5,020,235
[45] Date of Patent: Jun. 4, 1991

[54] LAYOUT DEVICE FOR WALL MOUNTED ITEM

[75] Inventor: Ronald L. Martin, Bristol, Wis.

[73] Assignee: Honeywell Inc., Minneapolis, Minn.

[21] Appl. No.: 217,195

[22] Filed: Jul. 11, 1988

[51] Int. Cl.$^5$ .............................................. G01B 3/10
[52] U.S. Cl. ........................................ 33/668; 33/768; 33/670
[58] Field of Search ................. 33/668, 669, 666, 670, 33/138, 761, 768, 769, 770, 671

[56] References Cited

U.S. PATENT DOCUMENTS

| 2,649,787 | 8/1953 | Kobayashi | 33/668 |
| 2,807,886 | 10/1957 | Aciego | 33/761 |
| 3,100,941 | 8/1963 | Taylor | 33/668 |
| 3,148,455 | 9/1964 | Aciego | 33/668 |
| 3,336,678 | 8/1967 | Chamberlain et al. | 33/668 |
| 3,672,064 | 6/1972 | Elkins et al. | 33/668 |
| 3,842,510 | 10/1974 | Elliot | 33/668 |
| 4,286,387 | 9/1981 | Di Diego | 33/138 |
| 4,642,898 | 2/1987 | Miller | 33/761 |
| 4,667,412 | 5/1987 | Carlson | 33/666 |
| 4,760,648 | 8/1988 | Doak et al. | 33/668 |

FOREIGN PATENT DOCUMENTS 2809745 9/1979 Fed. Rep. of Germany ........ 33/666

Primary Examiner—William A. Cuchlinski, Jr.
Assistant Examiner—Christopher W. Fulton
Attorney, Agent, or Firm—Donald J. Lenkszus; Robert B. Leonard

[57] ABSTRACT

A layout device for locating a wall mounted item a specified distance from a reference point such as a floor includes a bracket which is removably mounted to a measuring tape. A level attached to the bracket indicates vertical alignment of both the extended tape and the item which is to be installed. The bracket includes protrusions which form indentations marking the measured location when the bracket is forced against the surface of the wall.

13 Claims, 1 Drawing Sheet

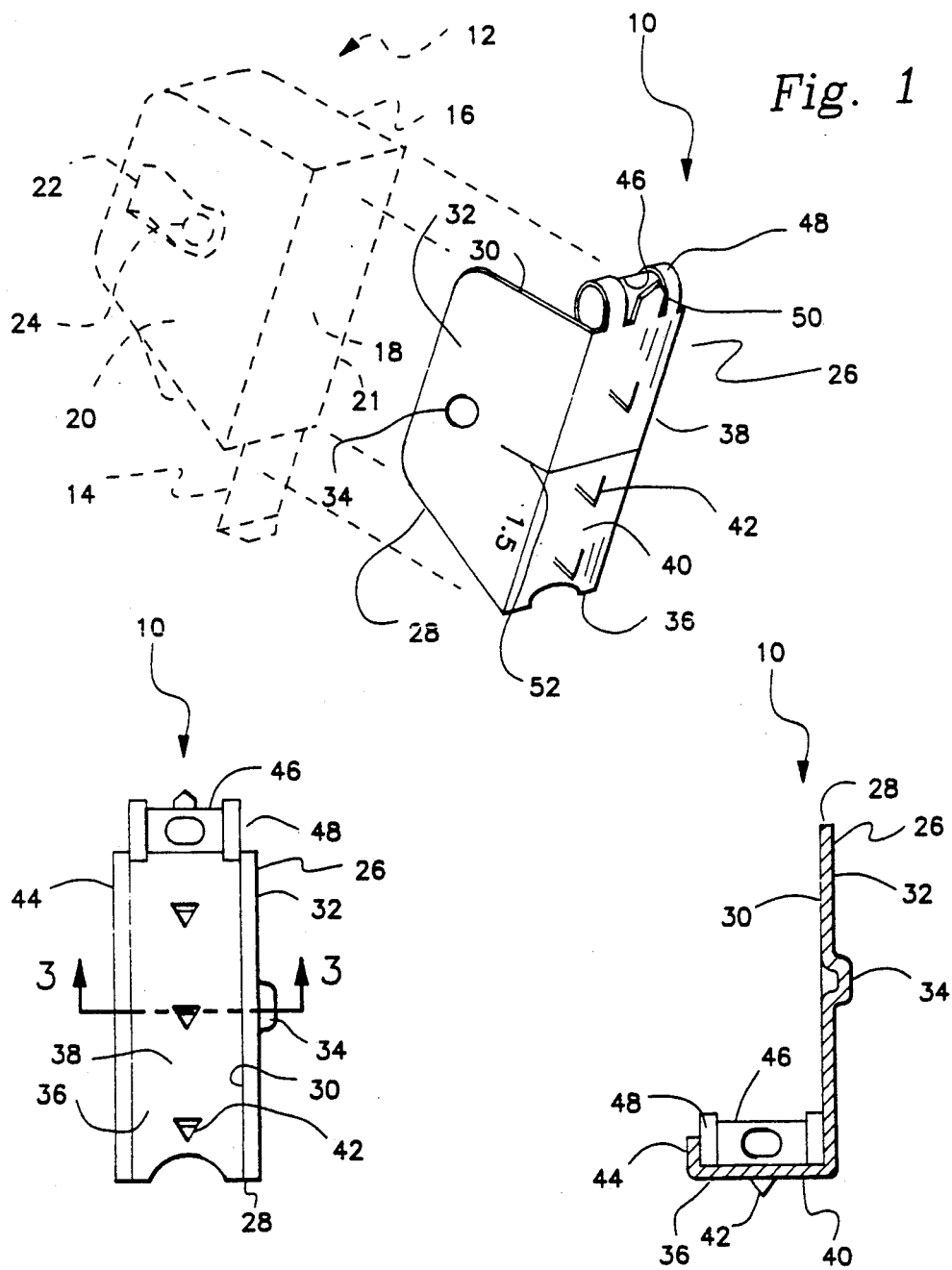

LAYOUT DEVICE FOR WALL MOUNTED ITEM

BACKGROUND OF THE INVENTION

The present invention relates generally to layout devices and particularly to devices used to locate wall mounted items a specified distance from a reference location such as a floor. One example of such a wall mounted item is a thermostat.

The statement "locate centerline of room thermostats 60 inches from floor level" is an example of a typical commercial building construction specification requirement. In the past the worker has required a tape measure, a level, and a marking instrument to locate the drilling location for mounting the thermostat backplate. The procedure in the past was to extend the tape to the desired mounting height, place the extended end of the tape at floor level, use the level to vertically align the tape, and use the marking instrument to mark the thermostat location. In addition the level was again needed to position the thermostat backplate in a level or plumb condition as a template before again using the marking instrument to mark the various drilling locations on the wall. The procedure required that the worker carry the tape measure, the level, the marking instrument, and the backplate and use them as described. Commercial buildings typically require numerous thermostats and the past procedure is time-intensive. A time savings of minutes or even seconds for each thermostat installed is significant in commercial buildings.

Thus a need exists in the field of layout devices for wall mounted items which does not require multiple separate tools and the repeated use of the separate tools to locate the drilling location. Further, a need exists for a layout device that is simple, easy to use, and time-efficient in marking the drilling locations.

SUMMARY OF THE INVENTION

The present invention fulfills these and other needs by providing a single device which permits the worker to define the thermostat location and mark the wall for drilling holes for the thermostat backplate mounting fasteners and for connection to the control system by electrical wiring, pneumatic tubing or other means.

In accordance with the principles of the invention, a device clips onto the housing of an ordinary extendable measuring tape. The device includes a spirit level which is used to vertically align both the extended measuring tape and the holes for mounting the thermostat backplate. In addition, the device includes one or more protrusions which when forced against a wall provide one or more marks for the drilling of holes for mounting the thermostat backplate on the wall and for the pneumatic tubing connection to the thermostat.

BRIEF DESCRIPTION OF THE DRAWINGS

The invention may be best understood from a reading of the following detailed description with the drawings in which:

FIG. 1 is a perspective view of a device in accordance with the principles of the invention;

FIG. 2 is a front plan view of the layout tool of FIG. 1;

FIG. 3 is a cross-sectional view of FIG. 2 along section line 3—3;

DESCRIPTION OF THE PREFERRED EMBODIMENTS

A layout device 10 may be used with an ordinary extendable measuring tape 12 shown in phantom in FIG. 1.

Measuring tape 12 is of the type commercially available and includes an extendable tape 14, tape housing 16, and clip 22 for attaching the measuring tape to a belt or the like. Clip 22 includes hole 24.

As shown in FIG. 3, device 10 includes bracket 26 having a first leg 28, a second leg 44, and connecting web 36. First leg 28 has a detent 34 formed thereon.

As best seen in FIGS. 1 and 3, web 36 has protrusions 42 formed on surface 40. Protrusions 42 are shown as barbs punched from web 36 but may be formed by screw points extending through web 36 or by other means. Protrusions 42 are used to indent the surface of a wall for marking for drilling or the like.

Device 10 also includes spirit level 46. Level 46 is attached by straps 48 or other means to bracket 26 with the longitudinal axis of level 46 perpendicular to the longitudinal axis of extended tape 14.

As best seen in FIG. 1, device 10 further includes horizontal centerline indicator 50 and vertical centerline indicator 52 for use in locating the centerlines of the thermostat to be installed a specified distance from reference points. The vertical thermostat centerline offset distance from the measuring tape indication is marked in inches (1.5) on first leg 28.

In use, bracket 26 slides onto tape housing 16. In the mounted position, inside surface 30 of first leg 28 abuts first side 20 of housing 16, leg 44 abuts second side 21 of housing 16, and inside surface 38 of web 36 abuts base 18 of housing 16. With bracket 26 in the mounted position, clip 22 engages outside surface 32 of first leg 28 and forces leg 28 against side 20 of housing 16. Detent 34 engages hole 24 in clip 22 to restrict movement of bracket 26 relative to housing 16.

To illustrate the operation, use, and advantages of device 10, it will be assumed that a worker has been instructed to mount thermostats with their centerline 60 inches above floor level. The worker would first mount device 10 to measuring tape 12 as described herein. The procedure would then be as follows:

Extend the tape to the specified mounting height less a predetermined offset amount marked on first leg 28 to compensate for a portion of the length of housing base 18;

Position the extended end of the tape at floor level adjacent to the wall;

Position device 10 with pointed protrusions 42 near the thermostat location;

Use level 46 to position device 10 to a level condition with vertical centerline indicator 52 at the vertical centerline desired for the thermostat;

Press device 10 against wall surface with protrusions 42 forming indentations in the wall surface to mark the locations for drilling all holes required for mounting a thermostat.

Following the above procedure will allow the workers to rapidly and accurately mark the required locations for drilling.

While the mounting of a thermostat was used to illustrate the invention, it should be understood that device 10 may be advantageously used for defining the location of other wall mounted items.

It will be apparent to those skilled in the art that various other modifications to the embodiment would be within the spirit and scope of the invention.

What is claimed is:

1. A layout device for marking a measured location for use with a separate extendable measuring tape having a housing, the housing having a first side and a spring clip with a hole formed therein on said first side, said device comprising:
    a bracket mountable on said housing, said bracket also demountable from said housing to allow independent use of said extendable measuring tape, said bracket having a first leg, said first leg having a detent formed therein said first leg adapted to be engaged by the spring clip and resiliently forced against said housing, said detent for engaging said hole to further secure said bracket to the housing;
    means carried on said bracket for aligning said extendable measuring tape in a predetermined direction; and
    means carried on said bracket for marking a measured location.

2. The device of claim 1 wherein said aligning means comprises a spirit level carried by said bracket.

3. The device of claim 2 wherein:
    said extendable measuring tape is extendable along a first longitudinal axis; and
    said spirit level has a second longitudinal axis, and said spirit level is positioned on said bracket such that said second longitudinal axis is perpendicular to said first longitudinal axis, said level indicating vertical alignment of said extendable measuring tape.

4. The device of claim 2 wherein:
    said marking means comprises at least one protrusion extending from said bracket for causing a marking indentation when forced against a surface.

5. The device of claim 4 wherein said housing has a base, and said mountable bracket has
    a web adjacent said first leg, said web engaging said housing base.

6. The device of claim 5 wherein said housing has a second side, and said bracket includes a second leg adjacent said web and spaced from said first leg, said second leg engaging said housing second side.

7. The device of claim 1 wherein:
    said marking means comprises at least one protrusion extending from said bracket for causing a marking indentation when forced against a surface.

8. A layout device for defining a measured location for use with a separate extendable measuring tape having a housing, said housing having a base and first and second sides, said housing carrying a spring clip with a hole formed therein, said device comprising:
    a bracket mountable on said housing, said bracket having a first leg and a second portion connected to said first leg, said first leg having a detent formed therein for engaging said hole and being engaged by said spring clip and forced against said housing first side to secure said bracket, said second portion having an inside surface abutting said housing base;
    means carried by said bracket for vertically aligning said extendable measuring tape when performing a vertical measurement from a point of reference; and
    means carried by said bracket for marking said measured location.

9. The device of claim 8 wherein:
    said extendable measuring tape is extended along a first longitudinal axis; and
    said aligning means comprises:
    a spirit level carried by said bracket, said level having a second longitudinal axis perpendicular to said first longitudinal axis, said level for indicating vertical alignment of said extendable measuring tape.

10. The device of claim 9 wherein:
    said marking means comprises at least one protrusion from the bracket for marking a surface when forced against said surface.

11. A layout device for defining a measured location comprising:
    an extendable measuring tape having a housing, said housing having a base, a first side, and a second side, said housing carrying a spring clip with a hole formed therein;
    a bracket mountable on said housing, said bracket having a first leg and a second portion connected to said first leg, said first leg having a detent formed therein for engaging said hole and being engaged by said spring clip and forced against said housing first side to secure said bracket, said second portion having an inside surface abutting said housing base;
    means carried by said bracket for vertically aligning said extendable measuring tape when performing a vertical measurement from a point of reference; and
    means carried by said bracket for marking said measured location.

12. The device of claim 11 wherein:
    said extendable measuring tape is extended along a first longitudinal axis; and
    said aligning means comprises:
    a spirit level carried by said bracket, said level having a second longitudinal axis perpendicular to said first longitudinal axis, said level for indicating vertical alignment of said extendable measuring tape.

13. The device of claim 12 wherein:
    said marking means comprises at least one protrusion from the bracket for marking a surface when forced against said surface.

* * * * *